United States Patent

[11] 3,582,200

[72] Inventors Karl Vockenhuber
 Vienna;
 Anton Janous, Vienna-Mauer, both of,
 Austria
[21] Appl. No. 776,161
[22] Filed Nov. 15, 1968
[45] Patented June 1, 1971
[73] Assignee Raimund Hauser
 Vienna, Austria
 by said Janous
[32] Priority Nov. 20, 1967
[33] Austria
[31] A10460

[54] CINEMATOGRAPHIC CAMERA WITH AN ELECTRIC EXPOSURE CONTROL
 4 Claims, 7 Drawing Figs.

[52] U.S. Cl................................................ 352/178,
 352/141, 352/197
[51] Int. Cl............................................. G03b 1/20
[50] Field of Search............................. 352/174,
 178, 197, 141; 95/10 C; 200/50.3, 157, 61.58

[56] References Cited
 UNITED STATES PATENTS
3,186,319 6/1965 Hochstein.................. 352/178
3,317,270 5/1967 Koji sho..................... 352/178
 FOREIGN PATENTS
1,335,437 7/1963 France....................... 352/174

Primary Examiner—Louis R. Prince
Assistant Examiner—Denis E. Corr
Attorney—Ernest G. Montague ABSTRACT: A cinematographic camera, which comprises a casing having support surfaces. Exposure control means, a source of current and a switch are adapted to conductively connect the source of current and the exposure control means for energizing the latter. A handle is provided within the support surfaces forcibly actuable when propping the camera. Film driving means and release means for the film driving means are provided, and the latter are manually controllable, which when actuated switch on the film driving means. An interlocking device cooperates with the switch and the release means on the one hand to lock the release means in their rest position when the switch is open and the exposure control means are deenergized. On the other hand, they lock the switch in its working position, as long as the release means are actuated.

PATENTED JUN 1 1971    3,582,200

CINEMATOGRAPHIC CAMERA WITH AN ELECTRIC EXPOSURE CONTROL

The present invention relates to a cinematographic camera with an electric exposure control, with a camera release and a switch arranged in the circuit of the exposure control, and in case, also in the circuit of the camera driving motor, which switch is controlled by a handle that is forcibly displaced, when holding and/or propping the camera, thus closing the switch.

Problems arise with cinematographic cameras with electric exposure control in that the exposure control permanently consumes the current of the camera battery. Though the needed power requirement of these systems is very small, a considerable discharge of the battery occurs within few weeks. Therefore special switching arrangements have already been provided in the circuit of the exposure control to prevent the undesired discharge, when the camera is not in use. Since the users of these cameras frequently forget to operate these switches, it has also been suggested to provide switching arrangements, which forcibly close the circuit of the exposure control upon using the camera. These switches are controlled by adjustable head rests or by handles arranged in the range of the camera grip, which are forcibly operated while holding the camera. However these arrangements have not been perfectly satisfactory. Namely, during filming, the head rest controlling the switch or the handle arranged in the range of the camera grip was released, and the circuit of the exposure control was interrupted. By that the exposure control was dead, and faulty exposures occurred as a further consequence.

In order to avoid switching-off of the exposure control with a running of the camera motor, it has also been suggested to interrupt with the above-mentioned switch, not only the circuit of the exposure control, but also the circuit of the camera driving motor. However, this solution is also not satisfactory. Namely, with the release switched on, the circuit of the camera motor is interrupted and the camera driving motor, and with it the film transport slow down, and it is not guaranteed that the shutter covers the gate at standstill. It therefore frequently occurs that the last picture of the scene is overexposed and of no use.

It is an object of the present invention to provide a cinematographic camera whereby the disadvantages of the devices described above are avoided by providing locking devices corresponding with one another which are connected with the release as well as with the switch, the ranges of adjustment of which locking devices overlapping each other and alternatively locking the release when the switch is open, and on the other hand, when the switch and the release are in their on position locking the switch in this position.

It is another object of the present invention to provide a cinematographic camera in which advantageously the locking device connected with the release comprises a bar and the locking device connected with the switch comprises a cam or the like, whereby the bar can only then be set to its on position when the cam connected with the switch is in closed position, and the cam can only then return in its rest position when the bar together with the release are in their rest position.

With these and other objects in view which will become apparent in the following detailed description, the present invention will be clearly understood in connection with the accompanying drawings, in which.

Figure 1:
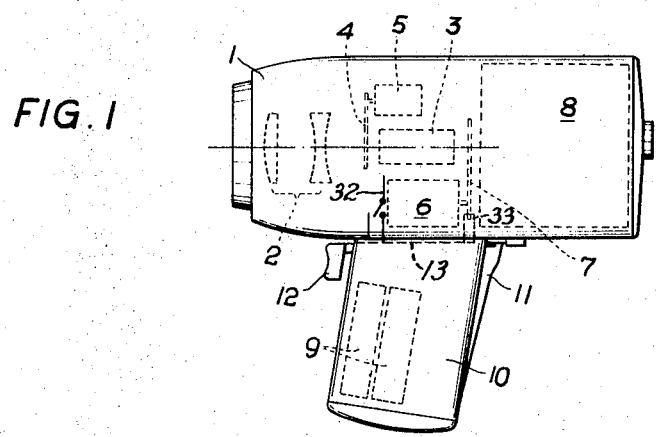
FIG. 1 is a side elevation of an 8 mm. cinematographic camera for substandard format film, in which the most essential components of the invention are schematically illustrated.
Figure 7:
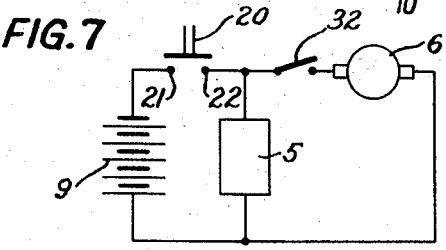
FIG. 7 is a circuit diagram of the switching circuit of the release and the switching of the exposure control.

Referring now to the drawings, and more particularly to FIG. 1, an 8 mm. substandard format film camera 1, designed in accordance with the present invention includes an objective which consists of an auxiliary zoom lens 2 and a main lens 3. Between the auxiliary zoom lens and the main lens there is provided a diaphragm which is adjustable by means of a galvanometer 5 in accordance with the light conditions of the scene to be taken. The control of the galvanometer 5 is effected by the aid of a photoelectric resistor or photoelectric semiconductor provided in the galvanometer circuit. As already known, this photoelectric resistor or—semiconductor may either be exposed to the light of the scene to be taken by a special optical system, or the photoelectric resistor or—semiconductor must be supplied with light derived from the path of rays of the objective. The camera driving motor 6, transports the film arranged in a cartridge 8 by means of a schematically indicated gearing 7. The camera driving motor 6 and the galvanometer 5 of the exposure control are fed by batteries 9 arranged in a hand grip 10 of the camera. On the rear side of the grip 10, a handle or yoke 11 is located, which controls and constitutes an actuating means for a switch in the circuit of the batteries 9 and which causes the batteries to be switched off, when the camera is not in use. Upon operation, a camera release 12, closes a switch 32 (FIG. 7) in the circuit of the camera motor 6 and simultaneously releases a mechanical lock (indicated in FIG. 1 by position 33) for the gearing 7. Upon setting the release 12 free, the gearing 7 is locked, so that the camera shutter covers the gate and simultaneously interrupts the motor circuit.

The release 12 is arranged on a slider 13 bearing a bar 14. In the position illustrated in FIG. 2, the slider lies opposite the control surfaces of a cam 17 rotating round an axis 16. This cam stands under an action of a return spring 18 and is urged against the extension 19 of the yoke 11. The extension 19 shows a longitudinal hole 23 in which the yoke 11 is guided by means of a stationary pin 24. The cam 17 is connected with a contact bridge 20, by means of a tiltable contact lever. Bridge 20 cooperates together with two stationary cooperating contacts 21, 22. By the contact bridge 20 the two cooperating contacts 21, 22 are conductively connected, as illustrated in the positions of FIGS. 3 to 6, the contact bridge 20 and the contacts 21, 22 constituting a switch. The switch 20—22 connects the exposure control as well as the camera driving motor 6 with the batteries 9. (Also note FIG. 7.)

Figure 2:
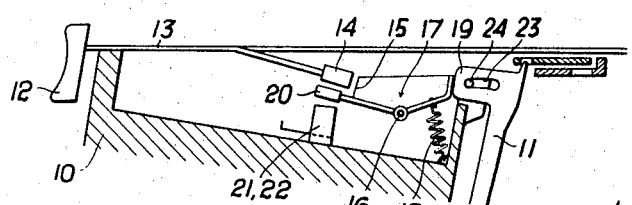
FIGS. 2 to 6 are enlarged sectional details of the camera shown in FIG. 1, in various sequential positions.
Figure 3:
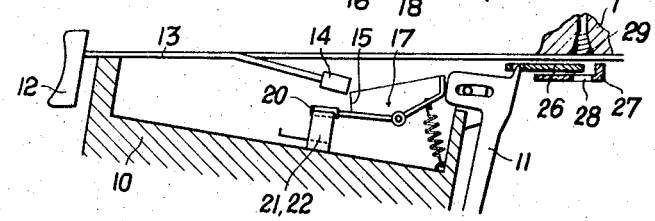
Figure 4:
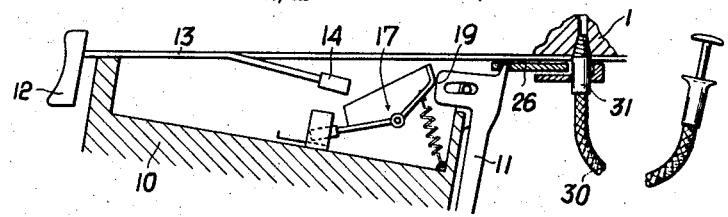
Figure 5:
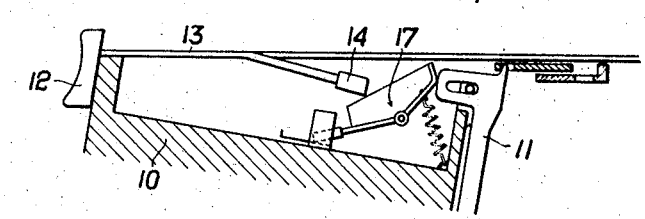
Figure 6:
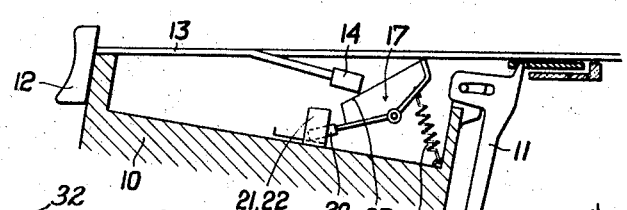

When, starting from the position illustrated in FIG. 2, the release is pressed down, the bar 14 abuts the control surface 15 of the cam 17, by means of which a further displacing movement of the release is prevented and the camera drive remains locked. When the camera is seized at the hand grip constituting surfaces for supporting the camera as usual, the yoke 11 is pressed down by the surrounding hand (see FIG. 4). By means of the extension 19 of the yoke 11 the cam 17 is turned in a counterclockwise direction, whereby the control surface 15 leaves the range of the bar 14 and simultaneously connects the contact bridge 20 with the cooperating contacts 21, 22. FIG. 3 shows an intermediate position, in which the switch 20—22 is already closed; the cam 17 prevents a displacement of the bar 14 and therewith a switching-on of the release. As soon as the yoke 11 is in the position as illustrated in FIG. 4, the release can be operated (FIG. 5). When the user releases the yoke while the release is pressed down, the cam 17 and with it the contact bridge 20 can not yet return to the initial position. The return spring 18 biases the cam in the clockwise direction, whereby however the cam abuts the bar of the release with its control surface 25 and consequently is hindered in a further rotating movement (see FIG. 6). In that way the circuits of the exposure control and of the camera driving motor remain closed as long as the release 12 is operated. Upon setting the release free the cam 17 also returns again to its initial position (see FIG. 2) and opens the switch 20—22.

In order to guarantee that the circuit is switched on, also in case the camera is fixed upon a tripod, the yoke 11 is connected with a slider 26, which is held and guided by a cover plate 27. The cover plate 27 is provided with an opening 28, which corresponds with the connection bore 29 for a wire release 30. When the yoke 11 is not in the position, the connection bore is thoroughly or at least partially covered by the slider 26. For screwing-in the wire release 30, first the yoke 11 is pressed down, whereby the connection bore is set free by the slider. Upon releasing the yoke 11, the slider 26 and with it also the yoke 11 can no longer return to their initial positions, since the slider 26 abuts the cylindrical case 31 of the wire release.

By the arrangement designed in accordance with the present invention it is guaranteed that the exposure control is always switched on prior to the camera driving motor, so that the diaphragm vane 4 already reaches a stationary position when the film is set free for exposure. On the other hand the novel arrangement of the present invention prevents the film transport mechanism from being stopped with an open shutter.

The invention is not restricted to the embodiment described above, but may be modified in various ways as to the structure of the cam 17 and the bar 14.

We claim:

1. In a cinematographic camera
a casing,
surfaces for supporting said camera and disposed on said casing,
exposure control means,
a circuit including a source of current,
a switch being adapted to conductively connect said source of current and said exposure control means energizing the latter,
said switch disposed within said circuit of said source of current,
actuating means for said switch arranged in the area of the support surfaces and for being forcibly actuable when holding the camera,
film driving means,
a manually controllable release means for said film driving means which when actuated switches on said film driving means,
an interlocking device cooperating with the said switch and the said release means, on the one hand locking said release means in its rest position when said switch is open and the exposure control means deenergized, on the other hand locking said switch in its working position as long as said release means is actuated.

2. In a camera, as set forth in claim 1, wherein
said interlocking device comprises,
a bar coupled with said release means,
cam means coupled with said switch,
said cam means having at least two locking surfaces,
one of said locking surfaces lying opposite said bar when both said release means and said switch are in their rest positions, locking said release means in the latter position,
the second of said locking surfaces lying opposite said bar when both said release means and said switch are in their working positions, locking the switch in the latter positions independent of the position of the said actuating means.

3. In a camera, as set forth in claim 2, wherein
said switch comprises a tiltable contact lever,
said cam means being coupled with said contact lever,
a return spring holding said contact lever in its rest position, and
a stationary contact cooperating with said contact lever.

4. In a camera, as set forth in claim 1, wherein
said support surfaces comprise a pistol grip having an axis,
a longitudinal handle on said grip, extending essentially parallel to said axis, said handle constituting said actuating means being coupled with said switch.